Sept. 2, 1941.  C. W. JOHNSTON  2,254,223
TIRE DEFLATION INDICATOR SWITCH
Filed April 12, 1940   3 Sheets-Sheet 1
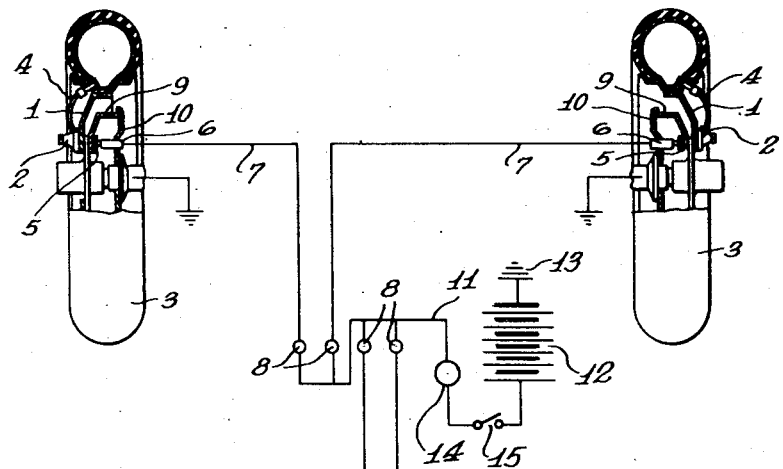
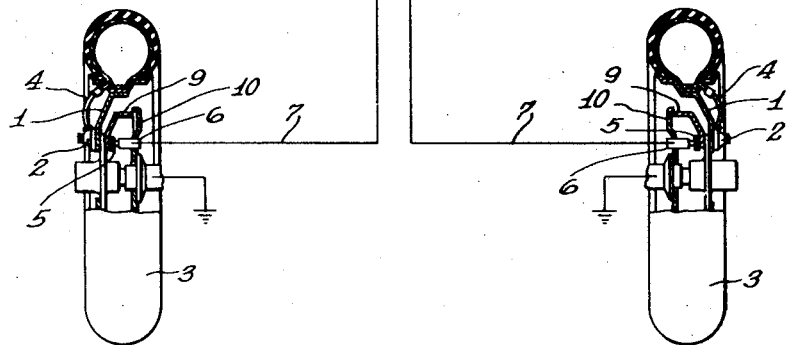
Fig. 1.
INVENTOR.
Carey W. Johnston
BY
ATTORNEY.

Sept. 2, 1941.  C. W. JOHNSTON  2,254,223
TIRE DEFLATION INDICATOR SWITCH
Filed April 12, 1940  3 Sheets-Sheet 2
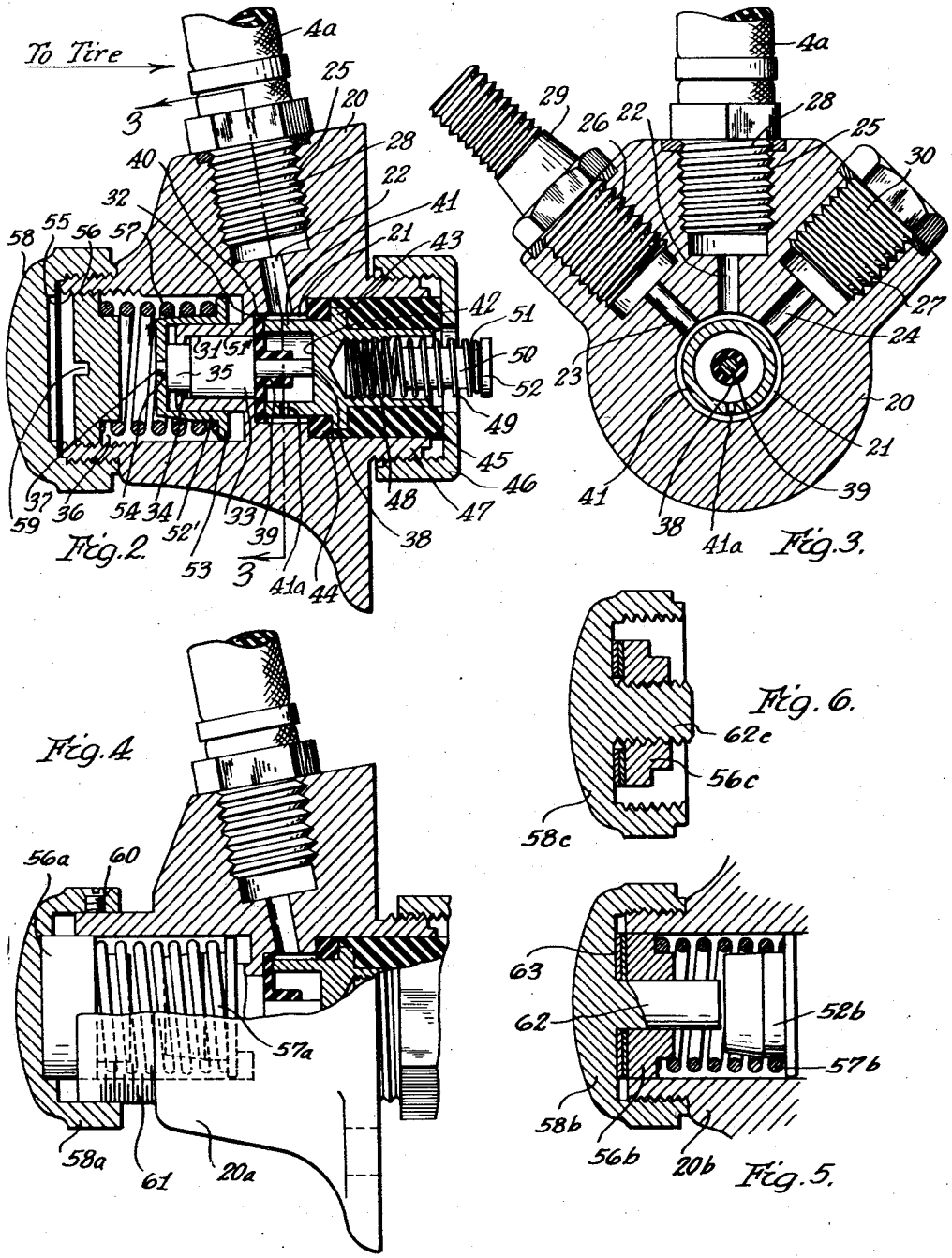
INVENTOR.
Carey W. Johnston
BY
ATTORNEY.

Sept. 2, 1941.   C. W. JOHNSTON   2,254,223
TIRE DEFLATION INDICATOR SWITCH
Filed April 12, 1940   3 Sheets-Sheet 3

INVENTOR.
Carey W. Johnston
BY
ATTORNEY.

Patented Sept. 2, 1941

2,254,223

UNITED STATES PATENT OFFICE 2,254,223

TIRE DEFLATION INDICATOR SWITCH

Carey W. Johnston, Newark, N. J.

Application April 12, 1940, Serial No. 329,237

6 Claims. (Cl. 200—58)

This invention relates to signalling apparatus for use in conjunction with automotive vehicles, trailers and semi-trailers having pneumatic tires, and has for its primary object to provide air pressure operated means adapted to respond to the air pressure in the tires for actuating electric signal devices when the air pressure in the tires is below a pressure which may be predetermined.

In my prior Patent No. 1,956,578 I have disclosed and claimed an air pressure actuated switch mechanism for indicator systems of the type here contemplated and this invention, generally speaking, relates to certain improvements thereover which result in greater dependability, greater simplicity from the standpoint of manufacture, assembly and installation, and a degree of compactness which provides for a material reduction in weight.

The present invention includes a pressure actuated switch adapted to be mounted upon the wheel of a vehicle, and connected to a tire on the wheel in such manner that when the air pressure is above a pressure which may be predetermined the switch is held open, and when the air pressure in the tire reaches the predetermined pressure the switch automatically closes. In an individual electric circuit with each pressure actuated switch is an indicator lamp, which is caused to become illuminated when the air pressure drops, to indicate to the operator of the vehicle the need for inflation of the particular tire. Common to all of the indicator lamps is an audible indicator, which is energized simultaneously with any or all of the indicator lamps. All indicator circuits are rendered operative and inoperative by the usual ignition switch of the vehicle, and therefore when a vehicle is at rest or parked, with the ignition switch open, the indicator lamps cannot operate and deplete the battery.

Another object is to teach the application of indicator systems of the type here contemplated in conjunction with dual wheels, or, in other words, wheels having two pneumatic tires instead of one as is usually the case. In this respect the invention teaches alternative applications, in one case using a single indicator switch in conjuncton with two tires, and in another case using dual indicator switches in order to operate an individual indicator lamp for each of the dual tires.

Another object is to provide a pressure actuated switch wherein the operating parts are so constructed and arranged that the complete assembly is extremely compact and of comparatively light weight. Compactness is extremely important because of the fact that in some installations the switch is mounted upon the outside of the wheel and necessarily projects outwardly in the direction of the hub. Obviously, this places it in a position where it would be subject to damage if it projected too great a distance. Lightness as to weight is also extremely important for the reason that the switch is necessarily mounted on the wheel radially spaced from the axis thereof. Thus, it constitutes an eccentric weight tending to throw the wheel out of balance, and requires static and dynamic counterbalancing. The switch structure here contemplated enables construction of a switch of such light weight that in the case of truck and trailer wheels it does not unbalance the wheel to an extent requiring counterbalancing.

Other objects and advantages will become more fully apparent as reference is had to the accompanying drawings wherein my invention is illustrated, and in which Fig. 1 is a diagram illustrating the switch mechanism in conjunction with electrical indcator means.

Fig. 2 is a vertical section of the pressure actuated switch.

Fig. 3 is a section taken on the line 3—3 of Fig. 2,

Figure 7:
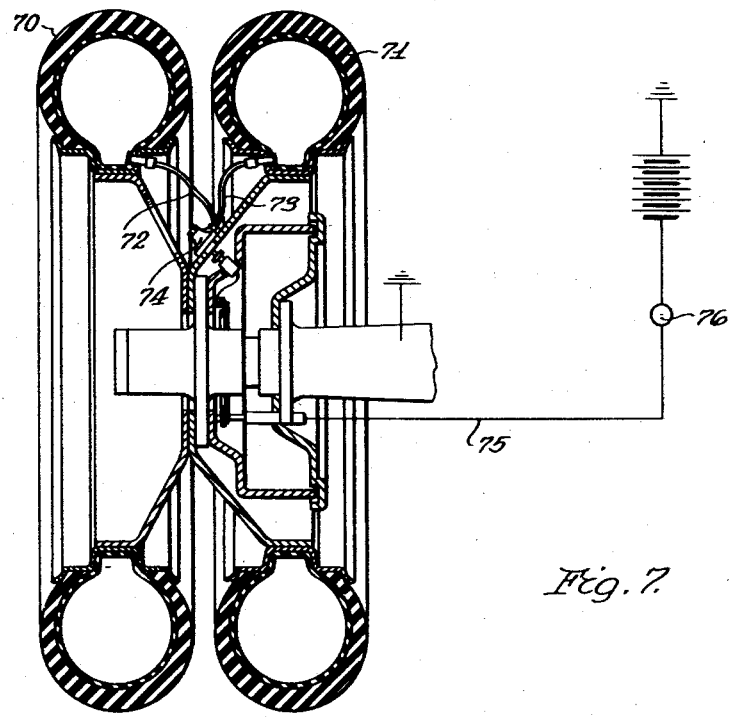
Figure 8:
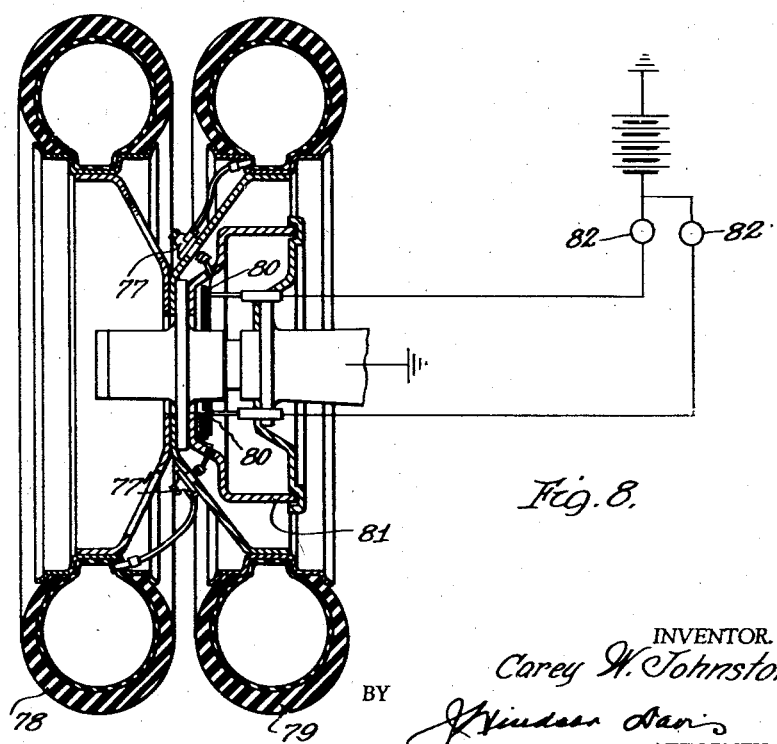

Fig. 4 is a view similar to Fig. 1, illustrating an alternative form of adjustment means, Fig. 5 is a fragmental section illustrating positive spacer means for maintaining different adjustments, Fig. 6 is a sectional view of a cap similar to that shown in Fig. 5, with a screwthreaded spring engaging member thereon, Fig. 7 is a sectional view of a dual wheel, illustrating a single indicator switch in connection with the two tires thereon, and Fig. 8 is a section of a dual wheel, illustrating an indicator switch individually connected to each of the two tires.

As illustrated in Fig. 1, each of the four wheels 1 of a vehicle has a pressure actuated switch device 2 mounted thereon and connected to a pneumatic tire 3, supported on the wheel, by a short length 4 of flexible tubing. The switch device, as is more particularly described hereinafter, constitutes an electrical switch adapted to be opened when the air pressure in the tire to which it is connected is above a point which may be predetermined, and adapted to close when the pressure falls below that point.

One of the contacts of each switch 2 is grounded, and the other contact is connected through a ring 5, brush 6 and lead wire 7 to an individual lamp 8. The ring 5 is preferably mounted on the inside of the brake drum 9, and the brush 6 is carried by the usual brake reaction plate 10. The lamps 8 are connected by a lead wire 11 to a battery 12, which is grounded at 13, and the lead wire 11 has an audible indicator 14 and a manual switch 15 therein.

When, through lack of pressure in any tire, the switch 2 connected thereto is closed, the lamp 8 connected to that switch is illuminated and the audible indicator 14 is energized. This circuit depends, of course, upon previous closing of the manual switch 15, which represents the conventional ignition switch of the vehicle. By rendering the entire indicator circuit subject to closing of the vehicle ignition switch there is no loss of power from the battery due to illumination of one or more of the lamps 8 while the vehicle is parked or at rest.

The construction of the above referred to pressure actuated switches 2 is shown more particularly in Figs. 2 and 3, and each comprises a metal body 20 having a cylindrical chamber 21 therein, sometimes referred to in the claims as the pressure chamber. Extending radially from the chamber 1 are passages 22, 23 and 24 which communicate with internally threaded sockets 25, 26 and 27, respectively. The socket 25 receives an externally threaded fitting 28 having a flexible conduit 4a, corresponding to the conduits 4 shown in Fig. 1, connected thereto and adapted to have its end which is broken away connected to a tire in the manner illustrated in Fig. 1. The socket 26 receives a fitting 29 adapted to have an air hose connected thereto for the purpose of inflating a tire by passing air through the chamber 21 and hose 4a thereto. It will be understood, although it is not shown, that the fitting 29 contains a valve such as is usually found in the valve stem of a pneumatic tire.

The passage 24 and socket 27 may serve two purposes. As illustrated, a plug 30 is placed in the socket, and this plug may be removed for connection of a second conduit thereto, for connection to a second tire. This arrangement is shown in Fig. 7, and is more particularly described hereinafter. The plug may also be replaced by a pressure relief valve, which makes it impossible to over inflate the tire, but inasmuch as such relief valves are already well known the same has not been illustrated.

Coaxial with the chamber 21 is a piston chamber 31, formed of smaller diameter than the chamber 21 so as to provide a shoulder 32, and having a piston 33 slidably received therein. The chamber 31 has an internal shoulder 34, adapted to limit sliding movement of the piston 33. A reduced end portion 35 of the piston 33 extends beyond the shoulder 34 into a spring chamber 36, and has an axially extending pilot portion 37. At its other end the piston has an axially extending stem 38, extending into the chamber 21, and constituting the movable contact member.

Surrounding the stem 38 is a rubber sleeve 39 having a radial flange 40 which is adapted to be pressed into sealing engagement with the shoulder 32 by an annular portion 41 of a contact member 42, the latter being adapted for contact with the movable contact stem 38. The contact 42 has a radial flange 43 adapted for sealing engagement with a sealing member 44, formed of insulating material. The flange 43 is pressed into engagement with the sealing member 44 by an insulating element 45 and a nut 46 screwed onto the portion 47 of the body 20. Simultaneously, the nut 46 and insulating element 45, press the annular portion 41 into sealing engagement with the sealing flange 40. Thus it will be noted that tightening of the nut in the manner above described maintains the sealing elements in an operative position, and also results in accurate positioning of the contact 42 in a stationary position for coaction with the movable contact 38. During tightening of the nut 46, the coacting sealing elements above mentioned are gradually pressed into operative relationship as a result of axial movement of the contact member 42. At the point in this axial movement of the contact 42 where the sealing means becomes effective, the contact 42 will be in the position shown, where it is contacted by the contact stem 38 while the piston 33 is in a normal position or a position of rest.

It will be observed that air under pressure may enter the chamber 21, and pass through a port 41a in the annular portion 41 to act against the piston 33, tending to move the latter toward the left hand side of Fig. 2. As shown, the stem or contact 38 is in contact with the contact 42, and when air under pressure is present the piston 33 is moved so that the shoulder between the main portion and the reduced end portion thereof engages the shoulder 34, at which time the contact 38 is spaced from the contact 42.

The port 41a is located as far remote from the passages 22, 23 and 24 as possible, preferably on the side of the annular portion diametrically opposite the passages. Therefore, if any drops of water or oil are accidentally introduced into the chamber 21 the arrangement of the port tends to preclude such water or oil from entering the annular portion 41 to corrode the contacts 38 and 42, or to so connect the two contacts that a false indication will be given.

The contact 42 has an internally threaded bore 48 in which the end of a coil spring 49 is screwed. A headed stud 50 has a groove 51 in which the final convolution of the spring 49 is wound to retain the stud within the spring. When the body 20 is mounted upon a wheel, as shown in Fig. 1 for example, the stud 50 constitutes a yielding conductor in the connection between the contact 42 and the rotatable ring, such as the ring 5.

The spring chamber 36 is so formed that it telescopes the piston chamber 31, which is defined by a cylindrical extension 51' extending axially into the spring chamber. Movable in telescoping relation over the extension 51' is a spring saddle 52' having an annular flange 53 and an apertured end wall 54 engaged by the reduced end 35 of the piston 33 and centered with respect thereto and with respect to the spring chamber 36 by the pilot portion 37. By forming the piston chamber 31 and the spring chamber 36 in telescoping relation a spring of greater length may be accommodated in a smaller body, than otherwise would be the case, and in addition the weight of the body 20 is reduced. Reduction in weight is important because the body 20 constitutes an eccentric weight when mounted on a wheel, and if it can be constructed of light enough weight, as in the instant case, the need for static and dynamic counter-balancing is not present.

The spring chamber 36 has an internally threaded portion 55 receiving an externally threaded spring follower 56, and a spring 57 is interposed between the follower 56 and the flange 53. A cap 58 closes the open end of the spring chamber.

The spring 57 acts to press the piston 33 in a direction to cause contact between the contact stem 38 and the contact 42, and in the event that air pressure in the chamber 21 is less than the pressure of the spring the contact stem 38 will be forced into engagement with the contact 42. When the air pressure exceeds that exerted by the spring the contacts will be separated. To vary the pressure of the spring, so that the contacts may be caused to open and close at any desired air pressure, the follower 56 is shifted. To shift the follower, the cap 58 is removed and a screw driver is inserted in the slot 59 in the follower.

Fig. 4 illustrates a switch mechanism which is identical to that above described with the single exception that the pressure of the spring is regulated differently. In this case, the cap 58a is axially slidable with respect to the body 20a, and is held in different positions of adjustment by a set screw. The spring follower 56a is in direct contact with the cap, and therefore when the cap is shifted axially the pressure of the spring 57a is varied. Gradations 61 may be provided as an aid to the operator in changing the setting of the spring pressure.

Fig. 5 illustrates a cap 58b having an axial stem 62 receiving a spring follower 56b slidably received thereon. The cap is screwed tightly onto the body 20b, and its location causes a known minimum pressure to be exerted by the spring 57b. To change the pressure setting, shims or washers 63 are placed between the follower 56b and the cap. These shims or washers may, for example, be of such thickness that each varies the spring pressure say ten pounds. The axial stem 62 is formed of a length such that it acts as a stop, to limit movement of the spring saddle 52b, and therefore of the piston which actuates the saddle.

Fig. 6 is similar to Fig. 5. It illustrates the spring follower 56c as having screwthreaded engagement with the axial stem 62c of the cap 58c.

In Fig. 7 there is illustrated a dual wheel, having pneumatic tires 70 and 71 connected by hose 72 and 73 to a single switch member 74. In this case one hose, 72 or 73, is connected to the socket 25 and the other is connected to the socket 27. With this arrangement the two tires are so connected that the air pressure will be the same in both, with the result that loss of air from either or both tires will ultimately result in closing of the switch. When the switch 74 is closed, it closes the circuit 75 and illuminates the lamp 76. Although connection of the two tires apparently has the disadvantage of bleeding air from a good tire to maintain pressure in a slowly leaking tire, it has the advantage that, under emergency conditions, the failing tire is temporarily supported for a period of time enabling uninterrupted travel of the vehicle to a point where repairs may be made.

In the dual wheel shown in Fig. 8 two switch members 77' and 77 are provided, connected to the tires 78 and 79 respectively, and each has an individual contact ring 80 in the brake drum 81. Each contact ring 80 is in circuit with a lamp 82, so that when either tire becomes deflated an individual signal is illuminated. In some cases it is contemplated that instead of two lamps 82, a single lamp will be used, which will be illuminated by either switch 77 or 77'.

Although specific embodiments of the invention have been illustrated and described, it will be understood that various changes may be made within the scope of the appended claims without departing from the spirit of the invention, and such changes are contemplated.

What is claimed is:

1. A pressure actuated switch comprising a body having a pressure chamber and a spring chamber, a transverse wall separating said two chambers and formed with a piston chamber opening into both chambers, a piston in said piston chamber, said piston having a contact extension extending into said pressure chamber, a seal on said contact extension and extending radially outwardly over the adjacent end of said piston chamber into engagement with the transverse wall, a contact in said pressure chamber and having an annular portion pressing said seal into engagement with said transverse wall, means for admitting air from the pressure chamber into said annular portion, and a spring in said spring chamber pressing said piston toward the pressure chamber.

2. A pressure actuated switch comprising a body having a pressure chamber and a spring chamber separated by a transverse wall, said transverse wall having an extension extending axially into the spring chamber and a piston chamber extending therethrough and opening into both chambers, a piston in the piston chamber, a contact in said pressure chamber and adapted to be moved by said piston, a fixed contact in said pressure chamber, a spring in said spring chamber at least partially telescoping said wall extension, means connecting the spring and remaining end of the piston in such manner that the spring urges the piston toward the pressure chamber, and an adjustable backing member for said spring.

3. A pressure actuated switch comprising a body having a pressure chamber and a spring chamber separated by a transverse wall, said transverse wall having an extension extending axially into the spring chamber and a piston chamber extending therethrough and opening into both chambers, a piston in the piston chamber, contact means in said pressure chamber adapted to be moved by said piston, a fixed contact in said pressure chamber, a spring in said spring chamber partially telescoping said wall extension, a saddle encircling said wall extension and having a portion engaged by the remaining end of said piston, a spring engaging said saddle, and an adjustable backing member for said spring.

4. A pressure actuated switch comprising a body having a pressure chamber and a spring chamber separated by a transverse wall, said transverse wall having an extension extending axially into the spring chamber and a piston chamber extending therethrough and opening into both chambers, a piston in the piston chamber, a contact adapted to be moved by said piston, said piston and wall extension having coacting portions limiting movement of the piston in a piston chamber, a fixed contact adapted to coact with said movable contact, a spring in said spring chamber partially telescoping said wall extension, means connecting the spring and remaining end of the piston in such manner that the spring exerts a force tending to urge the piston in a direction moving the movable contact into engagement with the fixed contact, and an adjustable member for varying the force of said spring.

5. A pressure actuated switch comprising a body having a pressure chamber and a spring chamber separated by a transverse wall, said transverse wall having a piston chamber extending therethrough and opening into the pressure and spring chambers, a piston in said piston chamber, said piston having a contact extension extending into the pressure chamber, a fixed contact in said pressure chamber, the other end of said piston extending into said spring chamber, a spring saddle on said last named end of said piston, a spring engaging said saddle, and an adjustable backing member engaging the remaining end of said spring.

6. A pressure actuated switch comprising a body having a pressure chamber and a spring chamber separated by a transverse wall having an opening therethrough, a spring in said spring chamber, a movable contact in said pressure chamber, a flexible sealing member overlying said opening for sealing said pressure chamber against loss of air through said opening, means extending through said opening and connecting said spring and movable contact, a second contact member having an annular portion engaging said sealing member outwardly of said opening, said second contact member and said body having coacting shoulder portions spaced from the transverse wall and with a sealing member interposed therebetween, an insulating member supporting said second contact member in said body, said insulating member and said second contact member having interengaging shoulder portions, and adjustable means on said body engaging said insulating member in such manner that said means when operated causes said insulating member to progressively press the annular portion and the first named contact shoulder portion into sealing relationship with their respective sealing members and coincidental with establishment of the sealing relationship to place the second contact in a position for coaction with the movable contact.

CAREY W. JOHNSTON.